(12) United States Patent
Sherwood

(10) Patent No.: US 6,605,326 B2
(45) Date of Patent: Aug. 12, 2003

(54) FOAM-HONEYCOMB SHELL

(75) Inventor: Kent Sherwood, Mlibut, CA (US)

(73) Assignee: Foam Matrix, Inc., Inglewood, CA (US)

( * ) Notice: Subject to any disclaimer, the term of this patent is extended or adjusted under 35 U.S.C. 154(b) by 144 days.

(21) Appl. No.: 09/742,572

(22) Filed: Dec. 20, 2000

(65) Prior Publication Data

US 2002/0022094 A1 Feb. 21, 2002

Related U.S. Application Data

(60) Provisional application No. 60/181,962, filed on Feb. 10, 2000.

(51) Int. Cl.[7] ................................................ B32B 3/00
(52) U.S. Cl. .................... 428/34.1; 428/34.2; 428/35.7; 428/36.1; 428/36.2; 428/36.5; 428/36.91; 428/116; 428/117
(58) Field of Search .............................. 428/34.1, 34.2, 428/35.7, 36.1, 36.2, 36.5, 36.91, 116, 117, 118; 441/74; 280/288.3; 244/119, 120, 121, 123, 124, 126

(56) References Cited

U.S. PATENT DOCUMENTS

| | | | |
|---|---|---|---|
| 3,902,944 A | * | 9/1975 | Ashton et al. ............... 156/156 |
| 4,664,974 A | | 5/1987 | Sherwood ................ 428/309.9 |
| 4,857,380 A | | 8/1989 | Sherwood ................... 428/117 |

* cited by examiner

Primary Examiner—Harold Pyon
Assistant Examiner—Alicia Chevalier
(74) Attorney, Agent, or Firm—Leon D. Rosen

(57) ABSTRACT

A shell part formed of honeycomb (20) with fibrous reinforcing regions (21, 24) at inner and outer surfaces of the honeycomb and with foam material (26) penetrating the honeycomb cells and reinforcing regions, where the outer surface of the article is convexly curved and the inner surface of the article is concavely curved. This permits the construction of a hollow object (10) by connecting the ends of two shell parts together. Each shell part is formed by laying an outer region of fibrous material including cloth (30) sandwiched between tissue paper layers (32, 34, 35), against a mold wall 44. Next, a honeycomb sheet is laid over the outer region and an inner region (21, 60, 62) of fibrous material is laid over the honeycomb. Then, foamable material (26) is laid in the mold and the mold is closed to cause the expanded foam to penetrate the honeycomb and most of the fibrous layers. When the mold is open, foam above an inner fibrous layer is torn away, along with a releasable Nylon cloth (60) of the inner fibrous region, to leave the shell part.

3 Claims, 4 Drawing Sheets

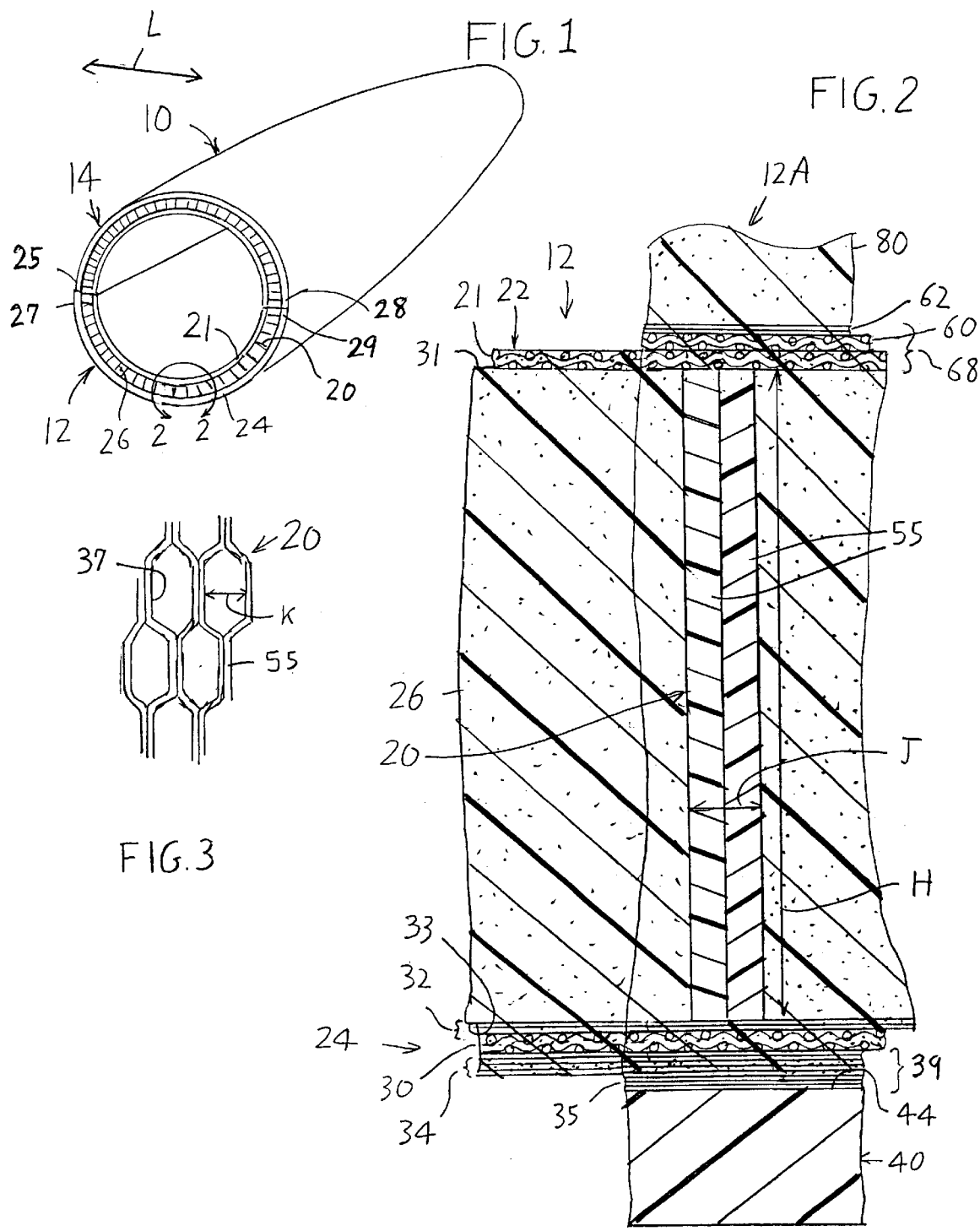

FOAM-HONEYCOMB SHELL

This application claim the benefit of Provisional Application Ser. No. 60/181,962, filed Feb. 10, 2000.

BACKGROUND OF THE INVENTION

My earlier U.S. Pat. No. 4,857,380 describes a foam reinforced article such as a surfboard or airplane wing, with honeycomb sheets at the top and bottom of the article and with fibrous layers at opposite faces of each honeycomb sheet. Foamed polymer material such as urethane foam, penetrates the article. The foam lies in cells of the honeycomb sheets, lies in the reinforcing fibrous layers at opposite faces of each honeycomb sheet, and fills the space between the fibrous sheets at the top and bottom honeycomb layers.

There are applications where lightweight hollow shells are required, such as for the fuselage of an airborne vehicle and for a strong but lightweight container. If the combination of a honeycomb sheet with fiber reinforced surface, and foam impregnating the honeycomb and fibrous reinforcing region, could be adapted to a shell part, this would enable the construction of lightweight but strong shells.

SUMMARY OF THE INVENTION

In accordance with one embodiment of the present invention, a lightweight reinforced shell part or apparatus is provided, which can be used as part of a shell to hold other apparatus, wherein the shell part is constructed of honeycomb-and-fiber reinforced foam for high strength and low weight. The shell part includes a honeycomb sheet that is bent to have a convex outer surface and concave inner surface, a fibrous reinforcing region at the outer surface, and preferably with a fibrous reinforcing region at the inner surface, with the honeycomb and reinforcing regions being filled with expanded polymer foam. The outer fibrous reinforcing region includes layers of fibrous material with microscopic pores such as those of tissue paper, and preferably with a layer having larger holes such as a woven cloth. The inner reinforcing region has a layer with larger holes such as a woven cloth layer. As a result of manufacturing, there are numerous projections of torn foam at the inner surface of the shell part.

The shell is formed by laying tissue paper against a concave mold wall, laying a cloth over the bottommost tissue paper, laying at least one tissue paper layer over the cloth, and laying honeycomb over the other layers. Then an inner fibrous region is laid on the inside of the honeycomb. Finally, foamable material is placed over the inner fibrous region and the mold is closed.

As the foam expands, it presses the inner fibrous region against the honeycomb to press the honeycomb tightly towards the mold wall and to press the outer fibrous reinforcing region against the mold wall. Foam penetrates everything except some of the tissue paper that lies against the mold wall, to avoid the need to remove foam directly from the mold wall.

The mold is opened so the molded item can be removed, and foam is torn off the molded item. One of the fibrous layers lying at the inner surface of the honeycomb, is a porous Nylon layer or other low surface energy material which is porous and in a layer, which does not stick to foam. This makes it easier to tear away the foam at the outer surface of the Nylon layer. The result is a shell part reinforced through most of its thickness by foam-filled honeycomb, and with the surface region reinforced by fibrous material impregnated by the same quantity of foam.

The inner surface of the resulting shell has numerous projections where the foam was torn or cut loose from the cloth layer lying outside the Nylon cloth layer, which shows that the shell was constructed by cutting or tearing away foam.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of a portion of a shell of the present invention, with a section of the shell shown.

FIG. 2 is a sectional view of the area 2—2 of FIG. 1, with the left half of FIG. 2 showing the finished shell and with the right half of FIG. 2 showing the shell before it is removed from the mold and before portions of inner and outer regions are stripped away.

FIG. 3 is a plan view of a portion of the honeycomb of FIG. 2.

DESCRIPTION OF THE PREFERRED EMBODIMENTS

Figure 4:
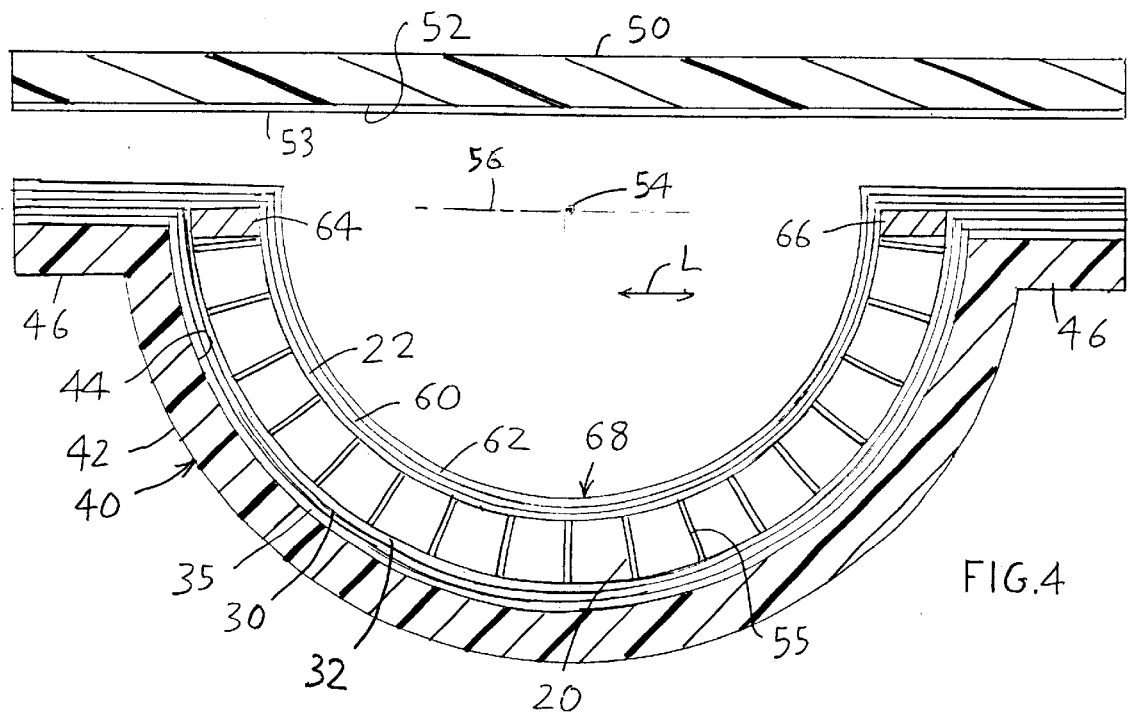
FIG. 4 is a sectional view showing a first step in the process of manufacture of a shell part, after layers are laid on the inside of a mold but before foam material is placed in the mold and the mold is closed.

FIG. 1 illustrates part of a shell 10 which is an airfoil structure such as a small aircraft fuselage. The apparatus includes two shell parts in the form of half cylinders 12, 14 that taper in diameter. Each part such as 12 includes a layer of honeycomb 20 that has been bent into a part cylinder shape, a fibrous outer surface reinforcing region 24 at the outside of the honeycomb, a fibrous inner surface reinforcing region 21 at the inside of the honeycomb, and a quantity of expanded foam 26. The expanded foam fills the honeycomb and the fibrous regions 21, 24 on the inside and outside of the honeycomb. The upper shell part 14 has opposite sides 25, 28 spaced in a lateral direction L, while the lower shell part 12 also has laterally spaced sides 27, 29. The two shell parts are joined at their sides.

FIG. 2 has a left side at 12 that shows the finished shell part, and has a right side 12A that shows the shell part during its construction. The walls of the honeycomb 20 occupy only a small portion (much less than half) of the volume of the honeycomb. The honeycomb, or honeycomb-type sheet structure 20, is shown in FIG. 3 as having hexagonal cells 37. However any structure with walls extending between opposite faces of the structure and with multiple empty cells constituting a majority of the volume of the structure, and usually more than 75% of the volume of the structure, is considered to be a honeycomb-type sheet structure, or honeycomb. The walls of the honeycomb may be resin-impregnated cardboard, aluminum, etc.

The upper or inner fibrous region 21 is formed of a woven cloth 22 that is impregnated by foam 26. The inner fibrous region lies against an inner surface 31 of the honeycomb.

The lower or outer fibrous region 24 includes a layer 30 of woven cloth, an inner layer 32 of one or two sheets of tissue paper, and an outer layer 34 of several pieces of tissue paper, all impregnated with foam. The outer fibrous region lies against an outer surface 33 of the honeycomb. The expanded foam 26, which may be a urethane foam or foam of other polymer, penetrates the pores of the upper fibrous region 21, the large volume between walls of the honeycomb, and the fibrous outer region 24. That is, the foam penetrates the layers of tissue paper 32, 34 and the lower cloth layer 30. The density of the foam is greatest in the outer fibrous region 24. However, everywhere, the foam holds the honeycomb and fibrous regions 21, 24 together, and also occupies all pores to prevent them from filling with moisture.

FIG. 4 shows a first step in the construction of the article or shell part with curved inner and outer surfaces. First, a mold is constructed with an outer, or a lower mold half 40. The outer mold half 40 includes a main part 42 having an inner surface 44 of the shape of the outside of the final shell part, and also has clamping flanges 46. A mold cover 50 is formed with a simple inner surface 52 which may be flat for ease of construction. Tissue paper sheets 53 cover the surface 52 to facilitate the separation of foam from the mold cover. The inner surface 44 of the main mold part, is covered by an initial layer 39 of tissue paper sheets (which includes layers 34 and 35 of FIG. 2) such as ten sheets of tissue paper that each have a thickness of about one mil (one mil equals one-thousandth inch). The tissue paper has pores of about the same or smaller diameter as the tissue paper thickness (the tissue paper is not woven, but is a matt with randomly oriented fibers). The tissue paper is laid in a dry state on the mold surface. Next, the woven layer 30 of cloth is applied over the tissue paper. The woven layer may be woven fiberglass having a thickness of perhaps five to ten mils, and having through holes of a width on the order of magnitude of ten mils. Next, the inner or upper layer 32, consisting of perhaps one or two sheets of tissue paper, is laid over the woven layer 30.

A next step is to lay the honeycomb 20 over the upper tissue paper layer 32 of the lower fibrous region 21. The honeycomb is flexible, in that it can be bent considerably (to a moderate radius of curvature) about one axis 54 (FIG. 4). The honeycomb has walls 55 extending toward the axis of curvature 54, with the walls having a height (FIG. 2) that is a plurality of times the wall thickness J (FIG. 2). The walls preferably have openings with widths K (FIG. 3) at least an order of magnitude greater than the pores of the tissue paper and many times greater than the holes of the cloth. The radial height H (FIG. 2) of the honeycomb is preferably at least an order of magnitude greater than that of the tissue paper, or even the cloth. The honeycomb layer, woven cloth layer, and paper layers can all be bent about a moderous radius of curvature about the axis 54 (FIG. 4). All of the layers can be bent slightly about two axes, including the axis 54 and the perpendicular axis 56, although only a large radius of curvature of bending about a second axis is easily made without creating wrinkles.

After the honeycomb 20 (FIG. 2) has been laid in place, the layer 22 of woven material such as woven fiberglass, is laid over the top of the honeycomb. Then, a peelable porous sheet 60 such as a fabric woven of Nylon (which has a low surface energy to not stick to the foam), is placed over the woven fiberglass cloth 22. Finally, one or two sheets of tissue paper at 62 are placed over the peelable layer 60. The layers, which form an initial inner region 68 of fibrous material, are shown in greater detail at the right side 12A of FIG. 2. It is noted that the connector beams at 64, 66 (FIG. 4) are placed at the laterally L spaced edges of the honeycomb to seal them and to provide a means to connect to the other part of the shell.

After the various layers have been laid in place as in FIG. 4, the mold top 50 is clamped to the flange 46 at opposite sides of the lower mold part. However, before such clamping, a controlled quantity of polymeric foamable material, whose ingredients have just been mixed, is laid in the mold, on the layer 62.

Figure 5:
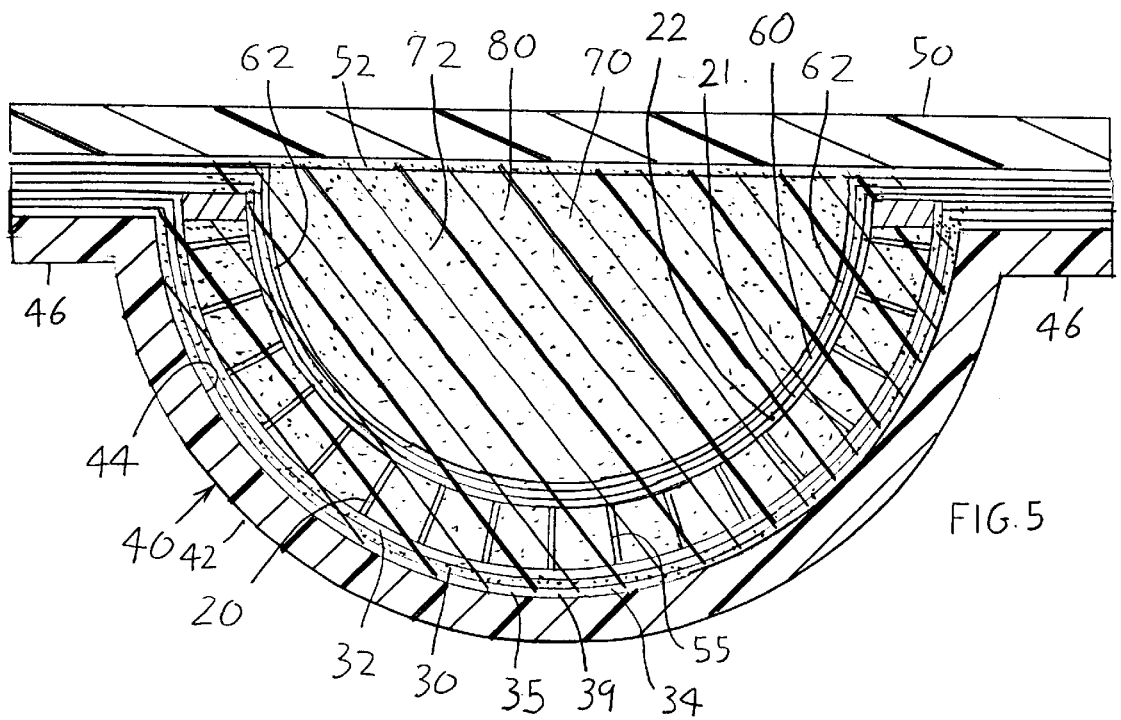
FIG. 5 is a view similar to that of FIG. 4, but after foam has been placed in the mold, the mold has been closed, and the foam has fully expanded in the mold.

As shown in FIG. 5, as the foamable material 70 expands, it first fills the large empty space 72 between the layers of tissue paper 52 and 62. Continued expansion of the foam results in increased pressure, causing the foam to pass through the porous layers or sheets 62, 60, 22, through the honeycomb 20, through the layers 32 and 30, and partially through the multiple sheets 39 of tissue paper. The innermost layer 62 of tissue paper has very small pores, so the pressure of expanding foam pushes the layer 62 and the other layers and honeycomb firmly toward the inner wall 44 of the lower mold part 40. The expanding foam rapidly passes through the cloth layers 60, 22 and through the large open spaces of the honeycomb. The expanding foam then presses the tissue paper layer 32 firmly towards the mold, passes through holes in the woven layer 30, and then slowly passes through the microscopic pores of the multiple sheets 39 of tissue paper. Passage through the multiple tissue sheets 39 is slow, and the amount of foamable material initially placed in the space 72 is selected so the foam does not pass all the way through the tissue paper layers 39. As a result, some layers 35 of tissue paper are not impregnated with foam, so foam does not stick to the mold inner surface 44. The process is somewhat similar to that described in my earlier patent U.S. Pat. No. 4,857,380. FIG. 2 shows, at 12A, the article with expanding foam, still in the mold.

After the foam has hardened, the mold cover 50 (FIG. 5) is pulled off. This usually occurs by tearing of the tissue paper 52. Then, the entire quantity 80 of foam material is torn loose, with the foam separating at the peelable layer 60. The Nylon of the peelable layer 60 does not adhere to foam, and when the quantity 80 is pulled out, the microscopic columns of foam that passed through passages in the peelable layer, break or are cut and the quantity of foam 80, sheet of tissue paper 62, and peelable layer 60 are torn free of the woven layer 22 of fiberglass that does adhere to the foam. It should be appreciated that the foam sticks to the entire area of the woven layer 22 of fiberglass, but not to the peelable layer 60, so the foam has to be torn apart only at the columns of foam that penetrate passages in the peelable layer. FIG. 2 shows, at 12, the article with the peelable layer 60 peeled off.

A next (or previous) step is to tear the unfinished article free of the lower mold part 40 (FIG. 5). This is accomplished by pulling out the article, with separation occurring at those sheets 34 of the layers 35 of tissue paper, that are not filled with foam. Any loose tissue paper on the inner or outer surfaces of the article can usually be peeled away, to leave an article that does not necessarily require sanding. FIG. 2 shows a portion 34 of the tissue paper layers that contain foam, separated from the rest 35 of the tissue paper layers.

Figure 6:
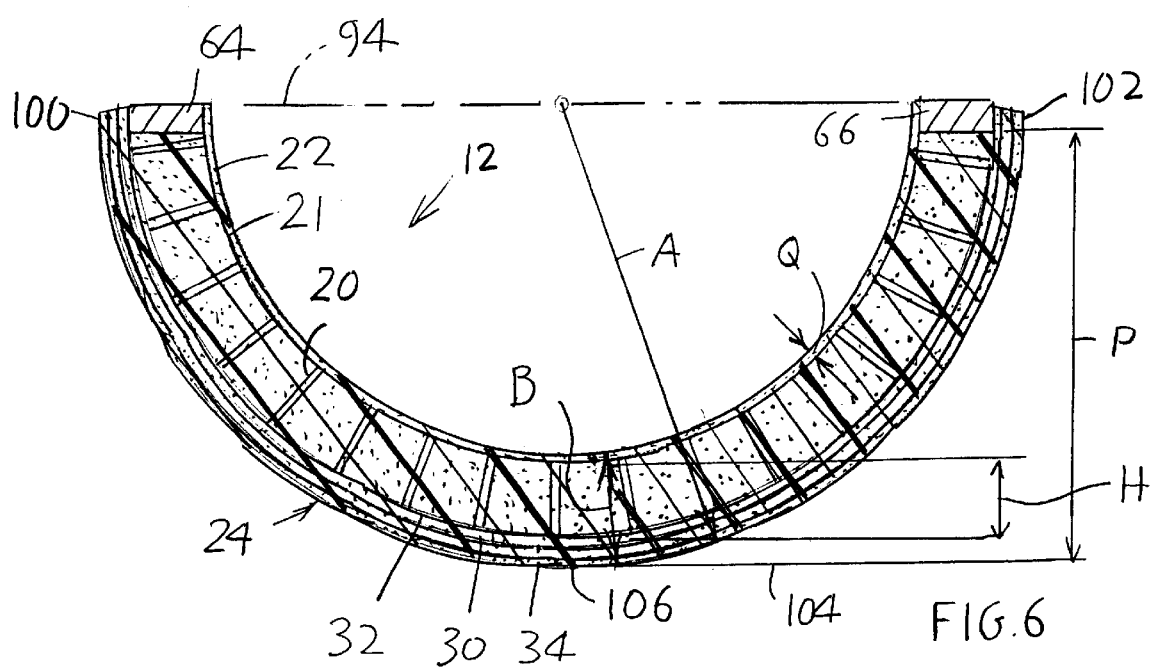
FIG. 6 is a sectional view of the shell part after it has been removed from the mold of FIG. 5, and portions of the molded part have been stripped away.

FIG. 6 shows the finished article 12. The finished article includes the inner fibrous region 21 formed by the woven layer 22 of fiberglass or other material impregnated with foam, the honeycomb 20, and the fibrous outer region 24. The outer region includes the layer 32 of tissue paper impregnated with foam, the layer 30 of woven fiberglass impregnated with foam, and layers 34 of tissue paper impregnated with foam. A single, integral quantity of foam material fills the cells of the honeycomb and impregnates the inner and outer reinforced regions 21, 24 of the shell part, or apparatus. The inner region 21 extends inwardly of the honeycomb inner surface by a distance Q that is much less than the thickness of the honeycomb. As mentioned below, the thickness Q can even be zero. This is because it is the outer region 24 that is subjected to the greatest forces and the inner region 24 is usually protected.

In the article 12, the density of foam is greatest in the outermost layers 32, 30 and 34 that form the fibrous outer region. This is because the foam has readily penetrated to these layers, but has been considerably slowed down in its expansion by the tissue paper layers 34 that will be torn away. Two identical articles 12 can be attached at their beams 64, 66 to create the shell structure 10 of FIG. 1.

Figure 7:
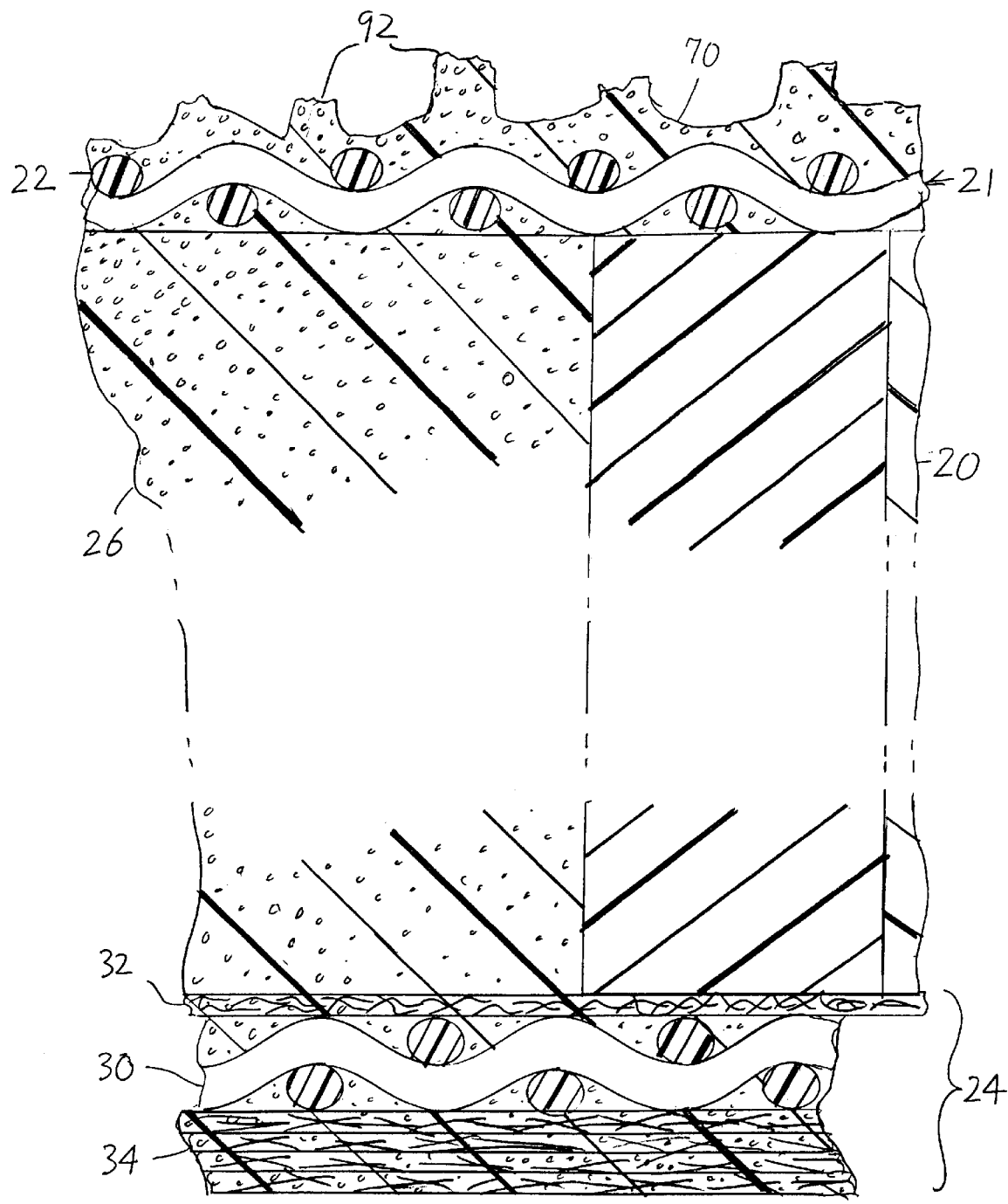
FIG. 7 is an enlarged partial sectional view of the finished shell shown at the left half of FIG. 2.

FIG. 7 shows that at the inner surface 70 of the article there are projections 92 of foam material that originally lay in the passages of the peelable Nylon cloth (60 in FIG. 2) that was torn or cut away (along with a large quantity of foam 80) from the cloth layer 22. The torn-away foam surface at 70 (FIG. 7) can be used without further coating, or may be coated with a layer of material such as resin to provide a smoother and better sealed surface. Although the foam-filled fibrous inner region 21 strengthens the inner region of the shell part, it is possible to provide a strong shell part without the cloth layer at the inner surface of the shell part. This can be done by placing a Nylon cloth against the inner surface of the honeycomb. However, when such Nylon cloth is torn free, chunks of foam may be torn out of the inner surface region of the honeycomb (unless the foam is cut as it is peeled) because there is no cloth layer to prevent such tear out of foam chunks.

In an article such as shown in FIGS. 2, 6 and 7, that applicant has constructed, the honeycomb 20 had a thickness H of 0.75 inch and the entire article had an outside radius of curvature A (FIG. 6) of 12 inches. Thus, the radius of curvature A of the outside of the structure was about sixteen times the thickness of the honeycomb and about fifteen times the thickness B of the walls of the article. In most cases, the height P of the curved foam impregnated article is at least twice the height H of the honeycomb when laid flat, so considerable bending of the honeycomb is required. The height P of the article is the distance between an imaginary horizontal line 94 connecting laterally opposite sides 100, 102 of the article, from a parallel horizontal line 104 that extends through the location 106 of the article that is furthest from the line 94.

Thus, by using a layer of flexible, or bendable honeycomb or other multi-cellular material and bending it to largely conform to the shape of a wall of a mold, and using various porous fibrous layers to control foam expansion and provide a foam-impregnated fibrous region at the outer surface of the foam-filled honeycomb, applicant is able to construct a lightweight highly curved article in a relatively low cost manner. Although it would be possible to reduce the amount of foam that is used, by making the foam cover concave to fill some of the space occupied by foam that is eventually discarded, applicant finds that the cost of articles having a limited run, is reduced by leaving a considerable quantity of hardened foam that must be thrown away.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An article with a hollow core, comprising:

a multicell honeycomb sheet structure having inner and outer surfaces, a fibrous outer reinforcing region that covers the outer surface of said honeycomb sheet structure, and foam material that penetrates said sheet structure and said fibrous outer region;

said fibrous outer region including a cloth layer having multiple threads and holes between the threads, and inner and outer tissue layers lying respectively against inner and outer surfaces of said cloth layer with each tissue layer having multiple threads and pores therebetween, with said holes having an average cross-sectional area greater than twice the cross-sectional area of said pores;

a reinforced fibrous inner region that includes an inner cloth layer having a thickness that is a plurality of times the thickness of each of said tissue layers, said inner cloth layer having multiple threads and holes therebetween, said inner cloth layer lying directly against the inner surface of the honeycomb sheet structure, the individual holes of said inner cloth layer having at least twice the cross-sectional area of individual pores of said tissue layers, and said quantity of foam material penetrating said inner region.

2. The article described in claim 1 wherein:

said article has inner and outer surfaces which are curved, with said outer surface being convex and said inner surface being concave.

3. A lightweight reinforced shell, comprising:

a plurality of shell parts that are joined together to form a hollow article, wherein each shell part has inner and outer surfaces and includes a multicell honeycomb sheet structure having inner and outer surfaces, a fibrous outer reinforcing region that covers the outer surface of the corresponding honeycomb-type sheet structure, and foam material that penetrates the honeycomb sheet structure and its corresponding fibrous outer reinforcing region;

each of said fibrous outer reinforcing regions includes a cloth layer having multiple threads and holes between the threads, and inner and outer tissue layers lying respectively against inner and outer surfaces of said cloth layer with each tissue layer having multiple fibers and pores therebetween, with said holes having an average cross-sectional area greater than twice the cross-sectional area of said pores;

each of said shell parts has an inner surface that is spaced from the inner surface of the other shell parts to leave a hollow region between them;

each shell part includes a reinforced fibrous inner region that includes an inner cloth layer with multiple threads and holes therebetween, with each inner cloth layer lying directly against the inner surface of the corresponding honeycomb-type sheet structure, and with the holes of said inner cloth layers having at least twice the cross-sectional area of said pores;

said foam material forms multiple projections projecting inwardly toward said hollow region from said inner cloth layer.

* * * * *